United States Patent
Rosilius et al.

(10) Patent No.: US 10,732,831 B2
(45) Date of Patent: Aug. 4, 2020

(54) METHOD FOR DETECTING A USER INPUT FOR AN INPUT DEVICE HAVING A PLURALITY OF SWITCH ELEMENTS, AND INPUT DEVICE

(71) Applicant: Volkswagen Aktiengesellschaft, Wolfsburg (DE)

(72) Inventors: Marcel Rosilius, Wolfsburg (DE); Dominik Ulrich, Wolfsburg (DE); Wojciech Huwer, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/462,672

(22) PCT Filed: Nov. 8, 2017

(86) PCT No.: PCT/EP2017/078526
§ 371 (c)(1),
(2) Date: May 21, 2019

(87) PCT Pub. No.: WO2018/095727
PCT Pub. Date: May 31, 2018

(65) Prior Publication Data
US 2019/0324637 A1    Oct. 24, 2019

(30) Foreign Application Priority Data
Nov. 23, 2016   (DE) ........................ 10 2016 223 176

(51) Int. Cl.
*G06F 3/0488*   (2013.01)
*B60K 37/06*    (2006.01)
(Continued)

(52) U.S. Cl.
CPC .......... *G06F 3/04883* (2013.01); *B60K 37/06* (2013.01); *G06F 3/0482* (2013.01);
(Continued)

(58) Field of Classification Search
CPC .......... B60K 2370/11; B60K 2370/111; B60K 2370/1446; B60K 2370/143;
(Continued)

(56) References Cited

U.S. PATENT DOCUMENTS

| 5,509,114 A | * | 4/1996 | Moran | ................ G06F 3/04883 345/443 |
| 2008/0165141 A1 | | 7/2008 | Christie | ........................ 345/173 |

(Continued)

FOREIGN PATENT DOCUMENTS

| DE | 102009024656 A1 | * | 3/2011 | ........... G06F 3/0482 |
| DE | 102009024656 A1 | | 3/2011 | ............. B60R 16/02 |

(Continued)

OTHER PUBLICATIONS

German Office Action, Application No. 102016223176.6, 6 pages, dated Aug. 7, 2017.

(Continued)

*Primary Examiner* — Mark Edwards
(74) *Attorney, Agent, or Firm* — Slayden Grubert Beard PLLC

(57) ABSTRACT

The invention relates to a method for detecting a user input for an input device having a plurality of switch elements, wherein a control action with a marking gesture and a selection gesture is detected. In doing so, at least one first and one additional switch element are marked sequentially in a specific sequence using the marking gesture, wherein initially the first switch element and then the at least one additional switch element is marked. Using the selection gesture, the marked switch elements are selected sequen- (Continued)

tially in reverse sequence. Depending on the selected switch elements, control signals are generated and output. The invention furthermore relates to an input device having a plurality of switch elements, a control unit and a detection unit by means of which a control action with a marking gesture and a selection gesture is detectable. In doing so, at least one first and one additional switch element are markable sequentially in a specific sequence using the marking gesture, wherein initially the first switch element and then the at least one additional switch element is markable. Depending on the selection gesture, the marked switch elements are sequentially selectable in the reverse sequence, and control signals can be generated and output depending on the selected switch elements.

18 Claims, 3 Drawing Sheets

(51) Int. Cl.
  *G06F 3/0481* (2013.01)
  *G06F 3/0482* (2013.01)
  *G06F 3/0484* (2013.01)
(52) U.S. Cl.
  CPC ...... *G06F 3/04817* (2013.01); *G06F 3/04842* (2013.01); *B60K 2370/11* (2019.05); *B60K 2370/143* (2019.05); *B60K 2370/146* (2019.05); *B60K 2370/1446* (2019.05); *B60K 2370/1468* (2019.05); *B60K 2370/199* (2019.05)

(58) Field of Classification Search
  CPC ........ B60K 2370/199; B60K 2370/146; B60K 2370/1468; B60K 37/06; G06F 3/04883; G06F 3/04817; G06F 3/0482; G06F 3/04842
  USPC .......................................................... 345/173
  See application file for complete search history.

(56) References Cited

U.S. PATENT DOCUMENTS

| | | | |
|---|---|---|---|
| 2010/0125787 A1 | 5/2010 | Chihara et al. | ................ 715/702 |
| 2010/0295779 A1* | 11/2010 | Pearce | ................ G06F 3/03545 345/157 |
| 2012/0030566 A1* | 2/2012 | Victor | ................... G06F 3/0482 715/702 |
| 2012/0098768 A1 | 4/2012 | Bendewald et al. | .......... 345/173 |
| 2013/0166146 A1 | 6/2013 | Tanaka | ............................ 701/36 |
| 2013/0246970 A1 | 9/2013 | Helle | ............................ 715/822 |
| 2015/0355782 A1 | 12/2015 | Zhang et al. | .................. 345/178 |

FOREIGN PATENT DOCUMENTS

| | | | | |
|---|---|---|---|---|
| DE | 102016223176 A1 | 5/2018 | ............. | B60R 16/02 |
| WO | 2018/095727 A1 | 5/2018 | ............. | B60K 37/06 |

OTHER PUBLICATIONS

International Search Report and Written Opinion, Application No. PCT/EP2017/078526, 20 pages, dated Feb. 13, 2018.

* cited by examiner

METHOD FOR DETECTING A USER INPUT FOR AN INPUT DEVICE HAVING A PLURALITY OF SWITCH ELEMENTS, AND INPUT DEVICE

CROSS-REFERENCE TO RELATED APPLICATIONS

This application claims priority to German Patent Application DE 10 2016 223 176.6, filed on Nov. 23, 2016 with the German Patent and Trademark Office. The contents of this application are incorporated herein for all purposes.

TECHNICAL FIELD

The present invention relates to a method for detecting a user input for an input device having a plurality of switch elements. Furthermore, it relates to an input device having a plurality of switch elements, in particular in a vehicle.

BACKGROUND

The use of a plurality of electronic and electronically controllable apparatuses, in particular in modern vehicles, gives rise to a need for ways of detecting and processing user entries. In particular, apparatuses or their individual components can be controlled by switch elements. In this context, the case frequently occurs that a plurality of buttons must be actuated in order to achieve a specific configuration. In doing so, a high degree of concentration is necessary in order to locate the buttons and precisely actuate them, especially when an actuating process must be executed repeatedly for different buttons. This is particularly disadvantageous during use in a vehicle, since the user in this case is frequently the vehicle driver who should be diverted as little as possible from his tasks of observing the surrounding traffic and controlling the vehicle.

SUMMARY

It is an object of the present invention to provide a method and an input device of the aforementioned type that enables particularly fast and reliable detection of user input.

The object is achieved by a method and an input device according to the independent claims. Some non-limiting embodiments and further developments are discussed in the dependent claims and the following description.

DETAILED DESCRIPTION

Figure 1:
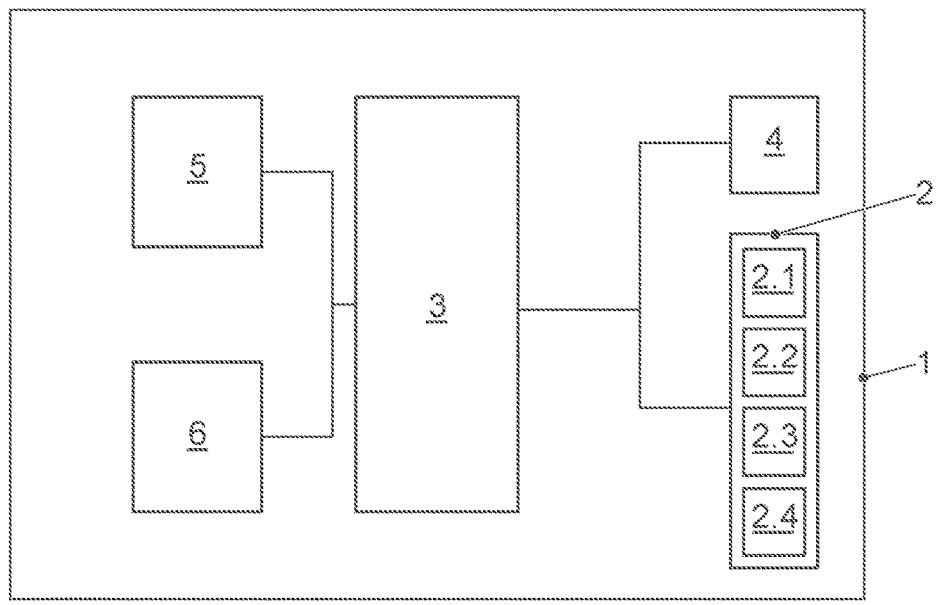
FIGS. 1 and 2 show an exemplary embodiment of an input device in a vehicle.

In one aspect, a control action is detected by a marking gesture and a selection gesture. At least one first and one additional switch element are marked sequentially in a specific sequence using the marking gesture, wherein initially the first switch element and then the at least one additional switch element is marked. Using the selection gesture, the marked switch elements are selected sequentially in the reverse sequence. Depending on the selected switch elements, control signals are generated and output.

Thus, a plurality of switch elements may be selected using a single control action, and corresponding control signals may be output.

In the present context, the input device comprises at least two switch elements that can be formed in a known manner. In particular, the plurality of switch elements may be formed in the same manner, for example as push buttons, capacitive sensors or other sensors by means of which an actuation may be detected depending on the control action. The actuation occurs in a similar manner, for example by means of touching a component of the switch element, or by suitably exerting pressure on the component.

According to the present aspect, the input device is formed in such a way that a marking and a selection are sequentially detectable for at least two of the switch elements. In particular, it is provided that the switch element is marked by a first actuation and selected by a second actuation. In doing so, it may be provided that the switch elements can be actuated in a different manner, and one switch element can be marked or selected depending on the type of actuation. Alternatively or in addition, it may be provided that one switch element is actuated to mark and select in the same way.

In the method, the switch elements are marked using a marking gesture, and selected using a selection gesture. To perform a "gesture" within the meaning of the present explanation, an actuating object is used, in particular a finger of the user or another actuating object such as a pen. The gesture comprises a certain movement that is executed by the actuating object and can be designed in a known manner per se, such as a pointing gesture, touching gesture or swiping gesture. Furthermore, gestures can be provided that are employed in daily use such as hand rotations, gripping gestures and combinations of a plurality of such gestures that may be quickly executed directly one after the other. In this case, switch elements are assigned to the gesture using the progression of a movement that is encompassed by the gesture, for example using positions that can be determined using the gesture, and the assigned switch elements can be actuated by the gesture. In doing so, the gestures are executed within a detection space, wherein it is provided in particular that a spatial relationship to the switch elements is established by the gesture. The gesture may comprise a touching of a surface and a progression of the movement along the surface.

In one embodiment, the marking gesture and/or the selection gesture comprise a touching of the first and the at least one additional switch element. This enables an actuation that is particularly easy to perform, wherein a clear spatial assignment may be accomplished by touching the switch element. In particular, the touching may be clearly assigned to a switch element so that a temporal sequence of a plurality of sequentially marked or selected switch elements can be determined.

In another embodiment, the touching of a continuous touch-sensitive surface is detected. In particular, the input device for the switch elements for which the marking gesture and the selection gesture are detected may have a continuous touch-sensitive surface. In particular, regions of the touch-sensitive surface may be assigned to the individual switch elements. Therefore a gesture for the switch elements may be detected particularly easily using a touching of the touch-sensitive surface.

The touch-sensitive surface may be formed in a manner known per se, like a surface of a touch sensor, like a capacitive sensor, or a touch element, or a touchscreen. By means of the touch-sensitive surface, the position may be detected at which the actuating object touches the surface. This can for example be done using a resistive, capacitive, or piezoelectric sensor. Furthermore, a flow of heat that for example is triggered by a user's fingertip may be measured.

Using the progression of the touching of the touch-sensitive surface over time, gestures may be detected, for example in the simplest case, the touching of the surface at a specific position, wherein the position is assigned to a switch element. Furthermore, a movement on the touch-sensitive surface may be detected from the marking gesture and/or selection gesture, wherein the position of touch changes without the touching itself being interrupted, and wherein a plurality of switch elements are actuated sequentially. In this case, a movement direction or movement speed can furthermore be detected and considered when evaluating the gesture.

In one embodiment, the switch elements comprise buttons that are displayed by means of a display device. The buttons can be formed very flexibly, for example with variable dimensions. For example, the buttons can be displayed on a display, wherein for example the buttons can comprise an icon or a label. In particular, the buttons may be displayed on the display surface of a touchscreen. Furthermore, the switch elements may be formed so that they can be made visible as needed, for example by generating an icon that refers to a switch element and is only visibly portrayed when the switch element can be activated, for example depending on whether a functionality linked to the switch elements is available.

In one embodiment, the marking gesture and/or the selection gesture are configured as a swiping gesture. In this case, the swiping gesture comprises a touching of a partially touch-sensitive surface at a start position, a change in the position of the touch along a trajectory, and an end of the touching at an end position. For example, the actuating object is brought into contact with the touch-sensitive surface at the start position and then moved along the trajectory, wherein the touch is basically not interrupted. To conclude the swipe gesture, the position of the touch reaches an end position, and the touch is concluded. The trajectories comprise a chronological sequence of positions on the surface that are sequentially touched. Switch elements can be assigned to these positions. A plurality of switch elements can be touched and actuated sequentially in this manner. Furthermore, at least one piece of direction information and/or speed information may be determined by the start and end position as well as the trajectory on the surface. In this case, the spatial resolution is composed as needed, i.e., a direction and/or speed of the movement may be detectable within the region of a switch element, or may be determinable using the sequence of the touched switch elements. For example, the direction in which a movement is executed in the region of a switch element can be taken into account.

In particular, the marking gesture and the selection gesture can be executed in the same manner. For example, the marking gesture and the selection gesture can be a swiping gesture.

In another embodiment, the marking gesture and/or the selection gesture comprise an unbroken control gesture. Adjacent switch elements can thus be marked and/or selected very easily and quickly. An "unbroken control gesture" designates a gesture that comprises an associated movement of the actuating object. In particular, the gesture is configured as an unbroken gesture along a surface such as a swiping gesture, i.e., the touching of the surface is not interrupted in the gesture.

A tolerance value may be provided so that, for example, a continuation of a gesture is detected when the time interval of an interruption of the gesture such as the detected touch does not exceed a certain threshold value. In this manner, an unbroken swiping gesture may for example be recognized when, due to external circumstances, an involuntary interruption of the touch is detected, for example when being performed in a traveling vehicle, or in the case of technical difficulties in continuously detecting the gesture.

Furthermore, a parameter for detecting the gesture may be appropriately selected, such as a parameter of a capacitive sensor that determines the maximum distance from the surface at which an actuating object is detected as being in contact with the surface. In this manner, a continuous detection of the gesture may be provided while the actuating object is not completely in contact with the surface.

The end of a gesture can for example be detected in that the touching of the surface is ended by the actuating object during a swiping gesture, wherein a certain time interval is provided following which the release of contact is detected as an ending of the gesture. Alternatively or in addition, a change in direction of the gesture can be detected and interpreted as the end of the gesture, for example by changing the direction of movement of the gesture or a section of the gesture is determined and compared with a threshold value.

Another embodiment may provide that the control action is detected using a touch on an interrupted touch-sensitive surface. Especially different, interrupted, touch-sensitive surfaces are assigned to the switch surfaces, wherein for example a gap can be provided between the regions of the surface that are assigned to the different buttons. That is, the gesture comprises sections between the touching of the individual regions of the touch-sensitive surfaces in which touching is not detected. Alternatively or in addition, an unbroken, touch-sensitive surface can also be configured, for example, by means of depressions or elevations that cause a haptically perceptible structuring of the surface for example during a swipe gesture that result in a brief interruption of the touching of the surface.

Alternatively or in addition, it may be provided that the marking gesture and/or the selection gesture is performed touch-free, for example by a pointing gesture within a detection space by means of which a direction can be determined within the space, and the switch element to which the pointing gesture is assigned can be detected in order to be able to mark or select the switch element.

In one embodiment, the marking gesture and the selection gesture are configured as a continuous control action. That is, the control action comprises an uninterrupted gesture whose first section is detected as a marking gesture, and whose second section is detected as a selection gesture.

In another embodiment, the marking gesture and the selection gesture are detected in the control action during a touching of a surface, wherein the touching of the surface is not interrupted during the control action. This beneficially enables a particularly fast selection of the switch elements.

In this case, an interruption of the control action, in particular by an interruption of touch, is not detected between the marking gesture and the selection gesture. For example, an actuating object is not lifted off of the surface between the marking gesture and the selection gesture. For example, it may be provided in this context that the control action comprises a movement on an at least partially touch-sensitive surface, wherein the marking gesture is first executed and then the selection gesture is executed without an interim release of touching.

The marking gesture and the selection gesture may be executed as swiping gestures in the control action, wherein a touching of a surface is not interrupted between the marking gesture and the selection gesture. In this case, the control action is configured as an unbroken swiping gesture during which the touching of the surface is not interrupted. As described in the preceding, the end of the marking gesture and/or the selection gesture can be detected when a change in direction of the movement on the surface is detected. An interruption of the touching, possibly for a duration longer than a threshold value, can be considered as the end of the control action.

In one embodiment, the control signal is generated after the end of the control action was detected. That is, the control signals are generated only after the conclusion of the marking gesture and the selection gesture. The control signals can thus be generated depending on how the entire control action was executed.

In particular, the selection gesture comprises an unbroken touching, a swipe gesture for example, and the end of the control action detects when the touch is released. Furthermore, the end of the control action may be detected when the first switch element that was marked during the marking gesture is selected in the selection gesture.

Alternatively, control signals can already be generated once one of the previously marked switch elements is selected during the selection gesture. In this case, additional control signals can be generated after the end of the control action has been detected.

The method according to the present aspect provides that two or more switch elements are marked sequentially in a certain sequence. That is, the marking gesture is composed such that an actuation of the switch elements occurs sequentially in a certain chronological sequence. If the marking gesture comprises a swiping gesture, for example, the actuation of the switch elements can be actuated by a touch of a region of the surface assigned to the switch element, especially by a stroke over the region.

In an additional step, directly after the marking gesture, a selection gesture is detected by means of which the previously marked switch elements are selected. In this case, the selection occurs in a chronological sequence that corresponds to the reverse sequence of the marking. That is, the last marked switch element is selected as the first, and the first marked switch element is selected last.

In this case, it may be provided that the last marked switch element is automatically selected when the selection gesture for the switch element marked as the next-to-last is detected. This way, it is unnecessary to execute a separate selection gesture for the last marked switch element. The transition from the marking gesture to the selection gesture can be detected automatically. In particular, the control action can be made continuous, for example as an uninterrupted swiping gesture. In this case, the first switch element to be marked is touched at the beginning of the control action, and the position of the touch is shifted over additional switch elements to be marked up to the last switch element to be marked, wherein the touch is uninterrupted. A marking gesture is therefore performed as a swiping gesture from the first to the last switch element. Upon reaching the last switch element, the direction of the movement is reversed without interrupting the touch so that the position of the touch is executed in the now reversed sequence over the additional switch elements up to the first marked switch element. Upon reaching this first switch element, the touch is interrupted, for example by removing the finger from the surface, wherein the end of the control action is detected. That is, a selection gesture is performed in a continuous swiping movement from the last to the first switch element. In doing so, the previously marked switch elements are selected when a new touch is detected for them. The last marked switch element is automatically selected when the reversal in the direction of the movement is detected, i.e., when the selection of the next-to-last switch element is detected, and it is therefore also detected that the marking gesture has ended, and the selection gesture has begun.

In one embodiment, the control signals are generated depending on whether the first switch element is selected as the last one by the selection gesture. In particular, it may be determined whether the first switch element marked in the marking gesture is identical with the last switch element selected by the selection gesture. It may therefore be ensured that the control action has been completely and correctly executed. For example, one can thereby prevent undesired buttons from being selected when the control action has been imprecisely performed, or the user wishes to terminate the input during the control action. For example, it can be provided that the control signals are not generated when the selection gesture is only performed for a partial amount of the previously marked switch elements, for example when the selection gesture is only performed from the last marked switch element up to the second marked switch element. This can be provided in the event that the selection gesture is performed beyond the first marked switch element, and for example a previously unmarked switch element is included by the selection gesture.

It may furthermore be provided that a message is output for a user when a control signal is not generated subsequent to the control action. This may for example be visually perceptible by a notification on a display, and/or by a light effect that is generated by the input device, and in particular in the region of the switch elements, for example by a flashing or a color change of the switch elements that were previously marked and/or selected without corresponding signals being generated and emitted.

In another embodiment, a highlighting of the marked and/or selected switch elements is generated for the marked and/or selected switch elements. Feedback can thus be provided as to which switch elements are marked or selected at the current point in time. In particular, the highlighting differs depending on whether a switch element is marked or selected so that a user receives feedback, for example when executing the marking gesture, on which switch elements were marked, and receives feedback during the subsequent execution of the selection gesture as to which switch elements were already selected or can still be selected, or respectively must be selected in order to conclude the control action.

For example, an icon can be portrayed on a switch element, wherein the highlighting comprises a change in a light parameter of the portrayed icon. For example, the highlighting can be produced by an image with a specific color, a change of the image, or a dynamic effect such as a pulsation. The highlighting can be generated in this case in a region assigned to the switch element, for example on a button or in a region adjacent to the button.

Alternatively or in addition, it can be provided that haptically perceptible feedback is output while marking and/or selecting a switch element, in particular while touching the respective switch element.

In one embodiment, a function status is determined for the selected switch elements, the control signals are furthermore generated depending on the respective function status, and an output is generated and output depending on the function status. Information on the control signals generated during the method may thus be detectably output for a user.

The function status may for example comprise information on whether a functionality controllable by a switch element is available. It may accordingly be provided for example that individual functionalities are temporarily unavailable and in particular cannot be controlled by the switch element. For example in one application of the method in a vehicle, controlling a specific vehicle component while driving can be impermissible due to legal regulations. Furthermore, the requirements for operating a specific functionality may not exist for example when an auxiliary heater can not be activated when the vehicle's energy reserve is low. If, during the marking and selection gesture, a button is marked and selected that is assigned a currently unavailable function, an output can be generated to notify just the user thereof. For example, the switch element can be portrayed in a specific way, for example by means of a color parameter or another imaging parameter, analogously to the above-described highlighting of marked and/or selected switch elements.

In one embodiment, at least two switch elements are assigned to a function cluster, and the control signals are generated depending on the selected switch elements that are assigned to the same function cluster as the first switch element. Therefore it can be ensured that, by means of the method according to the present aspect, a user input is detected for switch elements grouped according to functional aspects. In particular, an unintentional operation of switch elements can be avoided.

For example, switch elements can be assigned to a function cluster, and when they are selected, control signals are generated for functionally related apparatuses or the same apparatus. For example, a function cluster can relate to light functions or heating functions, for example in a vehicle.

In particular it may be provided in this case that first a switch element is marked during the control action and is assigned to a first function cluster, i.e., the control action may be assigned to the first function cluster using the first marked switch element. If switch elements of another function cluster are then marked during the marking gesture and selected during the selection gesture, these switch elements of the other function cluster can be ignored. In doing so, it may moreover be provided that an output is generated which notifies a user that a switch element was selected that is assigned to another function cluster and for which no control signals are therefore generated.

This may prevent undesirable switch elements from being marked and selected accidentally in a swiping gesture. This may be beneficial in an application in a motor vehicle where a movement of the vehicle for example from road unevenness and the reduced attention that can be given to the control process increase the danger of an operating error. For example, a "slip" during a swiping gesture may cause an operating error that can be prevented by ignoring switch elements from a different function cluster. In this case, it is assumed that the user wishes to make similar or functionally-related entries and therefore wishes to select switch elements of the same function cluster.

Alternatively or in addition, the control signals can be generated in another way when switch elements are selected that are assigned to a different function cluster than that of the first marked switch element. For example, an action assigned to the switch element can be executed, wherein a warning is simultaneously output.

It can furthermore be provided that the switch elements are arranged functionally grouped, so that an unintentional incorrect selection of a switch element can be prevented. In particular, switch elements that are assigned to a function cluster are arranged bordering each other.

In another embodiment, the control signals are transmitted to an apparatus to generate a light function or a heating function. Central functions, in particular in motor vehicles, can thus be operated.

The control signals may in this case affect different settings and functionalities of the apparatus, wherein the control signals are in particular generated so that specific settings assigned to the switch elements can be made independent of each other for the selected switch elements. For example, individual light or heating functions may be activated and deactivated.

The input device according to another aspect comprises a plurality of switch elements, a control unit and a detection unit, by means of which a control action by a marking gesture and a selection gesture is detectable. In doing so, at least one first and one additional switch element are markable sequentially in a specific sequence using the marking gesture, wherein initially the first switch element and then the at least one additional switch element is markable. Using the selection gesture, the marked switch elements are selectable sequentially in the reverse sequence. Depending on the selected switch elements, control signals can be generated and output.

The input device according to the present aspect is designed to implement the method according to the preceding aspect described above. The input device thus has the same benefits as the method according to the preceding aspect.

The control signals are output in that they are transmitted to an apparatus of the vehicle such as an apparatus for generating a light or a heating function. In this context, the control signals can relate to settings and/or functionalities of the respective apparatus. Furthermore, the control signals can relate to an activation or deactivation of a function of the apparatus.

In one embodiment of the input device according to the present aspect, the input unit comprises a touch-sensitive surface, such as a capacitive sensor, a touch element, or a touchscreen. In another design, the touch-sensitive surface is designed as a continuous surface. This allows the input to be configured to be easily detectable and operable.

The vehicle according to another aspect comprises an input device of the above-described type.

The invention is now explained in the following based on further exemplary embodiments with reference to the drawings.

An exemplary embodiment of the input device in a vehicle will be explained with reference to FIGS. 1 and 2.

A vehicle 1 comprises a detection unit 2 and a display 4 that is linked to a control unit 3. Furthermore, a heating apparatus 5 and a lighting apparatus 6 of the vehicle 1 are linked to the control unit 3.

Figure 2:
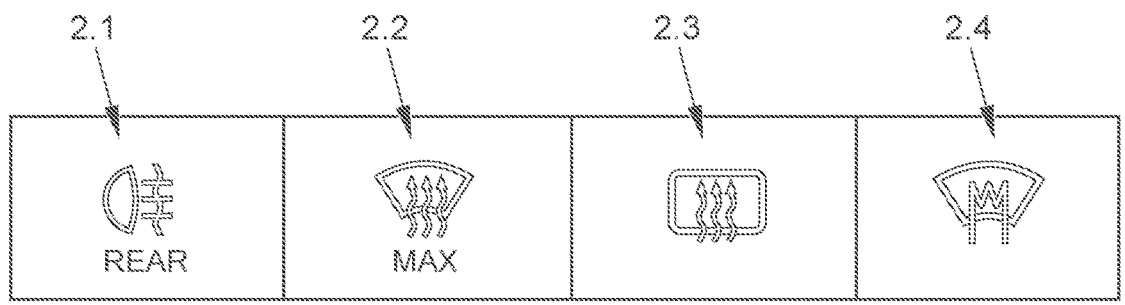
Figure 3:
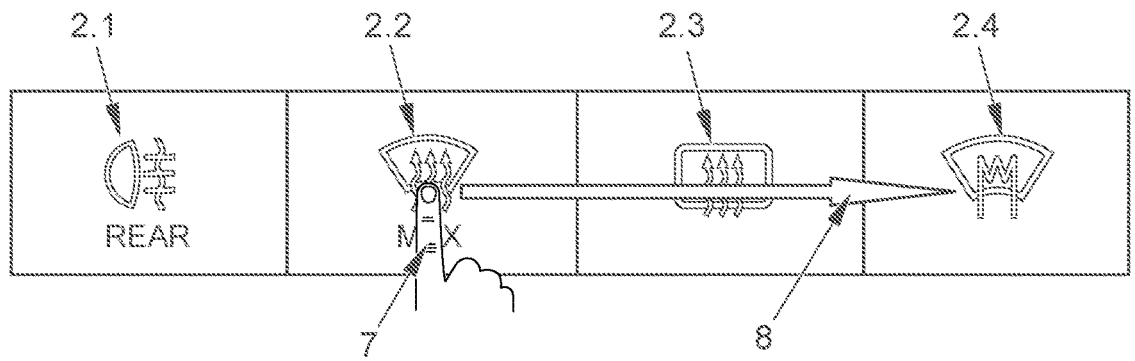
FIGS. 3 to 6 show a first exemplary embodiment of the discussed method.
Figure 4:
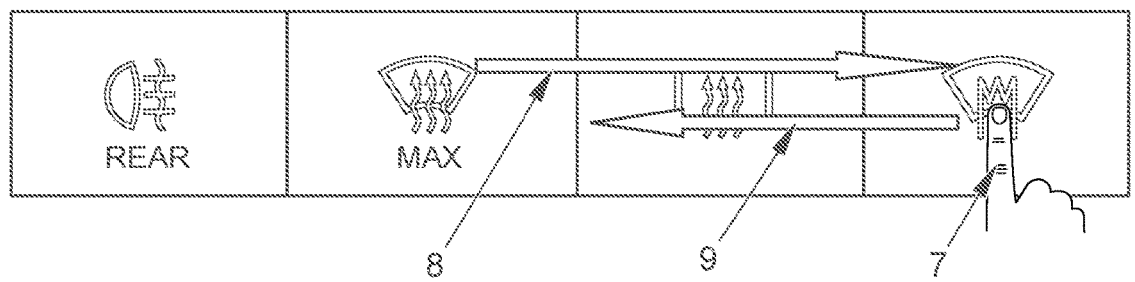
Figure 5:
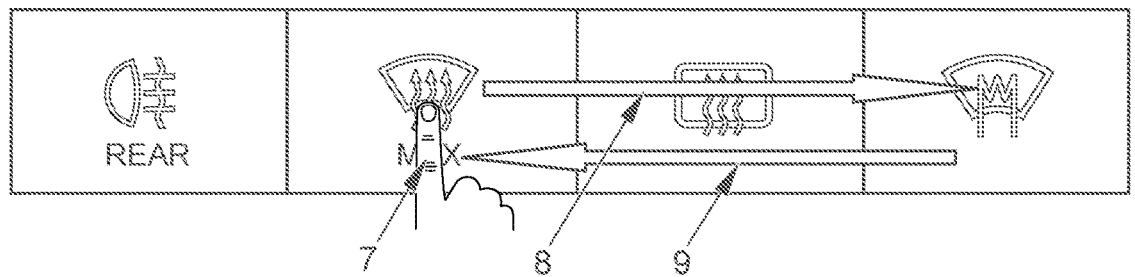
Figure 6:
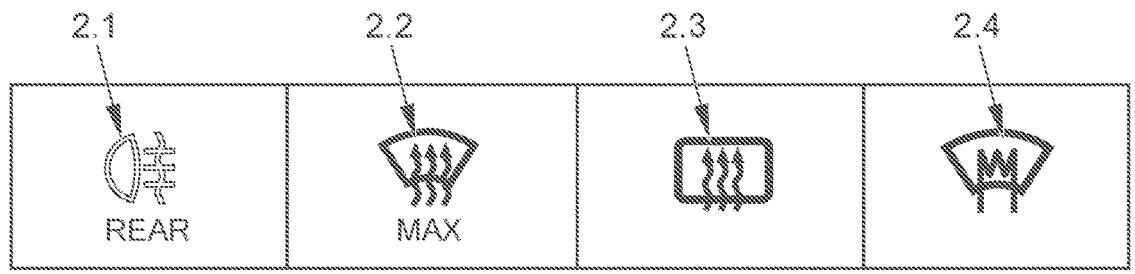

The detection unit 2 has four switch elements 2.1, 2.2, 2.3, 2.4 which are shown in greater detail in FIG. 2. In this case, it is provided in the exemplary embodiment that the detection unit 2 comprises an unbroken touch-sensitive surface on which the switch elements 2.1, 2.2, 2.3, 2.4 are formed, wherein the switch elements 2.1, 2.2, 2.3, 2.4 border each other, and haptically perceptible dividing elements are formed therebetween, in particular recesses in the touch-sensitive surface. In particular, the detection unit 2 is formed in the exemplary embodiment as a touch element.

In other exemplary embodiments, it can be provided that the switch elements 2.1, 2.2, 2.3, 2.4 are formed in another way, and in particular do not border each other. It can furthermore be provided that the detection unit 2 has a touchscreen on which the switch elements 2.1, 2.2, 2.3, 2.4 can be portrayed in particular in a freely programmable matter, wherein the touch-sensitive surface of the touchscreen is formed by a display surface.

The switch elements 2.1, 2.2, 2.3, 2.4 pertain to different functionalities of the heating apparatus 5 or respectively the lighting apparatus 6. By selecting a switch element 2.1, 2.2, 2.3, 2.4, a rear fog lamp for example (switch element 2.1), ventilation of the front windshield (switch element 2.2) or the rear window (switch element 2.3), or window heating (switch element 2.4) can be activated or deactivated. These functionalities are illustrated by icons that are portrayed on the touch-sensitive surface in the regions that are assigned to the switch elements 2.1, 2.2, 2.3, 2.4. Alternatively or in addition, other functions, in particular for other apparatuses of the vehicle 1 as well, can be controlled using the switch elements 2.1, 2.2, 2.3, 2.4.

With reference to FIGS. 3 to 6, a first exemplary embodiment will be explained. Herein, reference is made to the exemplary embodiment of the input device in a vehicle, as discussed in the preceding with respect to FIGS. 1 and 2.

A control action is detected by the detection unit 2, wherein the touch-sensitive surface of the detection unit 2 is touched by an actuating object 7, in the exemplary embodiment a finger 7 of a user, at a position that is assigned to a first switch element 2.2. Without releasing the touch, the finger 7 is moved to the right, wherein regions of the touch-sensitive surface are traversed that are assigned to the additional switch elements 2.3, 2.4. This progression of movement defines a gesture, like a swipe gesture that is known per se, that is interpreted as a marking gesture 8. The switch elements 2.2, 2.3, 2.4 that are sequentially touched in doing so are marked.

In another exemplary embodiment, it can be provided that the marked switch elements 2.2, 2.3, 2.4 are highlighted, for example in that the icons of the switch elements 2.2, 2.3, 2.4 are portrayed in another color or brightness and/or are pulsating.

Without releasing the touch of the touch-sensitive screen by the finger 7, a selection gesture 9 is performed after the marking gesture 8. Herein, the finger 7 moves such that the position at which the finger 7 touches the touch-sensitive surface of the detection unit 2 is moved so that the previously marked switch elements 2.2, 2.3, 2.4 are selected in reverse sequence. The exemplary embodiment provides that the last marked switch element 2.4 is automatically selected when the selection gesture 9 for the switch element 2.3 marked as the next-to-last is detected. At the end of the selection gesture 9, that is, when the first marked switch surface 2.2 is reached, the touch by the finger 7 is released. This is detected as the end of the selection gesture 9 and simultaneously as the conclusion of the control action.

Another exemplary embodiment can provide that switch elements 2.2, 2.3, 2.4 that are traversed when executing the selection gesture 9 are highlighted at the moment of touch in the selection gesture 9, for example in one of the above-described ways, such as by a change in the color or a light effect.

In a freely programmable display of the switch elements 2.1, 2.2, 2.3, 2.4 such as on a touchscreen, it can be provided that the displayed symbols are formed in the region of the switch elements 2.1, 2.2, 2.3, 2.4 in different ways when the switch elements 2.1, 2.2, 2.3, 2.4 have been marked or selected, wherein in particular different highlights are provided for marked and selected switch elements.

After the control action has been detected, control signals are generated by the control unit 3 and transmitted to the heating apparatus 5 of the vehicle 1. In the case shown here as an example, a control signal for the lighting apparatus 6 is not generated; in other exemplary cases, control signals can be generated alternatively or in addition for the lighting apparatus 6, in particular when a selected switch element 2.1, 2.2, 2.3, 2.4 is assigned a functionality of the lighting apparatus 6.

Figure 7:
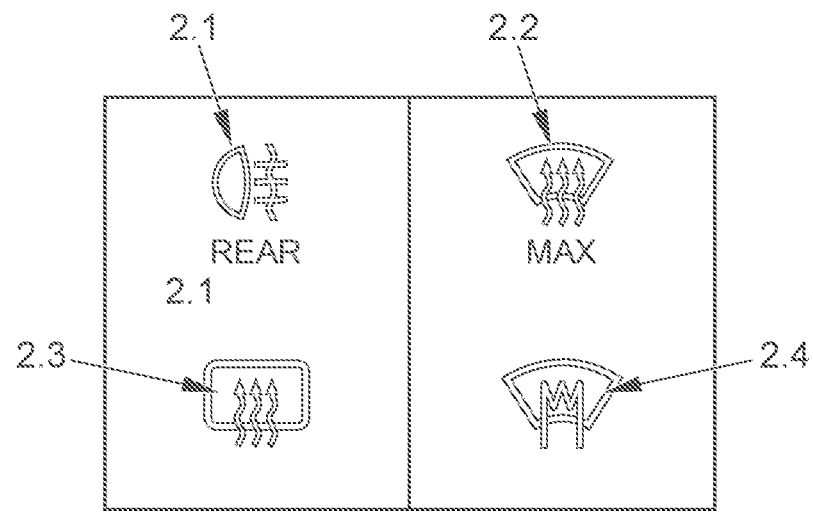
FIGS. 7 and 8 show another exemplary embodiment of the discussed method.
Figure 8:
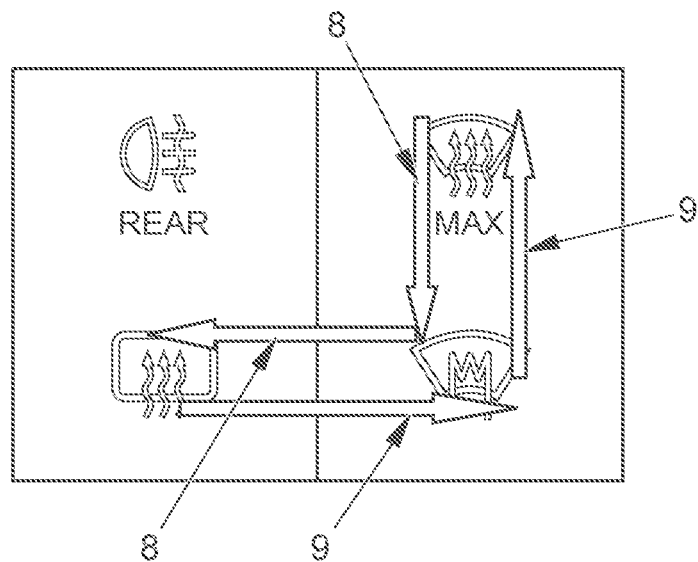

With reference to FIGS. 7 and 8, another exemplary embodiment is explained. Herein, reference is made to the exemplary embodiment of the input device in a vehicle, as discussed in the preceding with respect to FIGS. 1 and 2. Furthermore, the control action with a marking gesture 8 and a selection gesture 9 is detected principally in the same manner as with the first exemplary embodiment, explained with reference to FIGS. 3 to 6.

In contrast to the first exemplary embodiment, the switch elements 2.1, 2.2, 2.3, 2.4 are not arranged adjacently in the case shown in FIGS. 7 and 8, but rather adjacently and under each other. FIG. 8 shows that the marking gesture and the selection gesture can be used not just for switch elements that are arranged adjacently or under each other, but also for a mixture thereof. In the case shown in FIG. 8, a first 2.2, a second 2.4 and a third switch element 2.3 are touched and thereby marked sequentially by the marking gesture 8. For the selection gesture 9, the marking gesture 8 is basically reversed, i.e., starting at the third switch element 2.3, the movement is continued over the second switch element 2.4 up to the switch element 2.2 marked as the first. Upon reaching the switch element 2.2 marked as the first and selected last, the touch of the touch-sensitive surface by the finger 7 is ended, i.e., the finger 7 is lifted off of the surface.

Subsequent to the control action that comprises the marking gesture 8 and the selection gesture 9, control signals are generated and transmitted to the heating apparatus 5 in substantially the same manner as in the above-explained case of the first exemplary embodiment.

Another exemplary embodiment provides that the control signals are generated once a switch element 2.1, 2.2, 2.3, 2.4 is selected after the marking gesture 8.

It can moreover be provided that after a switch element 2.1, 2.2, 2.3, 2.4 is marked and/or selected, a notification is output on the display 4 of the vehicle 1 by means of which a user is informed of the performed settings.

In another exemplary embodiment, function clusters can be provided to which the switch elements 2.1, 2.2, 2.3, 2.4 are assigned. In the cases portrayed in FIGS. 2 to 8, for example three switch elements 2.2, 2.3, 2.4 can be assigned to a "lighting" function cluster, and one switch element 2.1 can be assigned to a "heating" function cluster. In addition, it can be provided that, when switch elements are marked and selected by the marking gesture 8 and the selection gesture 9, the different function clusters are assigned, and control signals are only generated for the switch elements 2.1, 2.2, 2.3, 2.4 that belong to the same function cluster as the first marked switch element 2.1, 2.2, 2.3, 2.4.

If for example in the case shown in FIGS. 7 and 8, the marking gesture 8 and the selection gesture 9 are performed such that an additional switch element 2.1 is also marked and selected, it is checked whether all the switch elements 2.1, 2.2, 2.3, 2.4 are assigned to the same function cluster. Herein, it is detected that the first marked switch element 2.2 is assigned to another function cluster than the last marked switch element 2.1, a control signal is not generated for this last marked switch element 2.1. In addition, it can be provided that a message is generated for a user in this case that can be output for example on the display 4.

Another exemplary embodiment can provide that the selection gesture 9 is performed such that the control action is already terminated before reaching the first marked switch element 2.2, in particular by prematurely releasing the touch by the finger 7. In this case, the control action can be considered terminated, and the output of the control signals can be omitted. Furthermore, the control action can be considered terminated when the selection gesture 9 is performed beyond the first marked switch element 2.2. In addition, it can be provided that a message is generated for a user in this case that can be output for example on the display 4.

Another exemplary embodiment can provide that individual switch elements 2.1, 2.2, 2.3, 2.4 are not permanently available. For example, a specific functionality that is controlled by a switch element 2.1, 2.2, 2.3, 2.4 can be unavailable during a trip or in a specific operating state of the vehicle 1. A function status can be determined for the switch elements 2.1, 2.2, 2.3, 2.4 that comprises information on whether a specific functionality is currently available. If a switch element 2.1, 2.2, 2.3, 2.4 is marked and selected that is assigned to a currently unavailable functionality, it can be provided that corresponding control signals are not generated. Alternatively or in addition, an output for a user can be generated, for example by a changed image of an icon in the region of the switch element 2.1, 2.2, 2.3, 2.4, and/or by a notification on the display 4 of the vehicle 1.

REFERENCE NUMBER LIST

1 Vehicle
2 Detection unit
2.1, 2.2, 2.3, 2.4 Switch element
3 Control unit
4 Display
5 Heating apparatus
6 Lighting apparatus
7 Actuating object; finger
8 Marking gesture
9 Selection gesture The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for detecting a user input for an input device for a vehicle, the input device having a plurality of switch elements, each configured for controlling one or more vehicle functions; wherein a control action with a marking gesture and a selection gesture is detected; wherein at least a first and at least one additional switch element of the plurality of switch elements are marked sequentially in a specific sequence using the marking gesture by moving in a first direction; wherein initially the first switch element and then the at least one additional switch element is marked; and using the selection gesture, the first and the at least one additional switch element are selected sequentially in a reverse sequence by movement in a reverse direction; and one or more control signals are generated and output for controlling the one or more vehicle functions of the first and the at least one additional switch element that have been marked and selected.

2. The method according to claim 1, wherein the marking gesture comprises a touching of the first and the at least one additional switch element.

3. The method according to claim 2, wherein the touching is detected on a continuous touch-sensitive surface.

4. The method according to claim 1, wherein the switch elements comprise control surfaces that are displayed by a display device.

5. The method according to claim 1, wherein the marking gesture comprises an unbroken control gesture.

6. The method according to claim 1, wherein the marking gesture and the selection gesture are detected in the control action during a touching of a surface, wherein the touching of the surface is not interrupted during the control action.

7. The method according to claim 1, wherein the control signals are generated after the end of the control action has been detected.

8. The method according to claim 1, wherein the control signals are generated depending on whether the first switch element is also selected as the last one by the selection gesture.

9. The method according to claim 1, wherein a highlighting of one or more of the marked and selected switch elements is generated for one or more of the marked and selected switch elements.

10. The method according to claim 1, wherein
a function status is determined for the selected switch elements;
the control signals are furthermore generated depending on the respective function status; and
an output is generated and output depending on the function status.

11. The method according to claim 1, wherein
at least two switch elements are assigned to a function cluster; and
the control signals are generated depending on the selected switch elements that are assigned to the same function cluster as the first switch element.

12. The method according to claim 1, wherein the control signals are transmitted to an apparatus for generating a lighting function or a heating function.

13. An input device for a vehicle comprising:
a plurality of switch elements, each configured for controlling one or more vehicle functions;
a control unit; and
a detection unit, configured to detect a control action with a marking gesture and a selection gesture; wherein
using the marking gesture, a first and at least one additional switch element of the plurality of switch elements are markable sequentially in a specific sequence by moving in a first direction; and using the selection gesture, the first and the at least one additional switch element are selectable sequentially by moving in a reverse direction; and wherein one or more control signals are generated and output for controlling the one or more vehicle functions of the switch elements of the plurality of switch elements that have been marked and selected.

14. The input device according to claim 13, wherein the detection unit comprises a touch-sensitive surface.

15. A vehicle with an input device according to claim 13.

16. A vehicle with an input device according to claim 14.

17. The method according to claim 1, wherein the selection gesture comprises a touching of the first and the at least one additional switch element.

18. The method according to claim 1, wherein the selection gesture comprises an unbroken control gesture.

* * * * *